US011117322B2

(12) United States Patent
Ng et al.

(10) Patent No.: US 11,117,322 B2
(45) Date of Patent: *Sep. 14, 2021

(54) ADDITIVE MANUFACTURING

(71) Applicant: Hewlett-Packard Development Company, L.P., Houston, TX (US)

(72) Inventors: Hou T. Ng, Campbell, CA (US); Alejandro Manuel De Pena, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 713 days.

This patent is subject to a terminal disclaimer.

(21) Appl. No.: 15/520,826

(22) PCT Filed: Jan. 14, 2015

(86) PCT No.: PCT/US2015/011368
§ 371 (c)(1),
(2) Date: Apr. 20, 2017

(87) PCT Pub. No.: WO2016/114772
PCT Pub. Date: Jul. 21, 2016

(65) Prior Publication Data
US 2017/0326799 A1    Nov. 16, 2017

(51) Int. Cl.
*B29C 64/291*    (2017.01)
*B33Y 10/00*    (2015.01)
(Continued)

(52) U.S. Cl.
CPC .......... *B29C 64/291* (2017.08); *B29C 64/153* (2017.08); *B29C 64/165* (2017.08);
(Continued)

(58) Field of Classification Search
CPC ........ B33Y 10/00; B33Y 30/00; B33Y 50/00; B33Y 70/00; B33Y 90/00; B29C 64/10;
(Continued)

(56) References Cited

U.S. PATENT DOCUMENTS 8,460,755 B2    6/2013    Rodgers
8,603,053 B2    12/2013    Riesinger
(Continued)

FOREIGN PATENT DOCUMENTS

JP    2006183146    7/2006
WO    WO 2012070052    5/2012

OTHER PUBLICATIONS

International Search Report and Written Opinion for International Application No. PCT/US2015/011368 dated Sep. 18, 2015, 12 pages.
(Continued)

*Primary Examiner* — Jacob T Minskey
*Assistant Examiner* — S. Behrooz Ghorishi
(74) *Attorney, Agent, or Firm* — Dierker & Kavanaugh PC

(57) ABSTRACT

In one example, a non-transitory processor readable medium with instructions thereon that when executed cause an additive manufacturing machine to inhibit build material in an overlying layer of build material from fusing with a first slice formed in an underlying layer of build material.

7 Claims, 7 Drawing Sheets

(51) Int. Cl.
  *B33Y 70/00*     (2020.01)
  *B29C 64/165*    (2017.01)
  *B33Y 30/00*     (2015.01)
  *B33Y 40/00*     (2020.01)
  *B33Y 50/02*     (2015.01)
  *B29C 64/153*    (2017.01)
  *B29C 64/188*    (2017.01)
  *B29C 64/393*    (2017.01)

(52) U.S. Cl.
  CPC .......... *B29C 64/188* (2017.08); *B29C 64/393* (2017.08); *B33Y 10/00* (2014.12); *B33Y 30/00* (2014.12); *B33Y 40/00* (2014.12); *B33Y 50/02* (2014.12); *B33Y 70/00* (2014.12)

(58) Field of Classification Search
  CPC ......... B29C 64/20; B29C 64/30; B29C 64/40; B29C 64/165; B29C 64/112
  See application file for complete search history.

(56) References Cited

U.S. PATENT DOCUMENTS

| | | |
|---|---|---|
| 8,765,045 B2 | 7/2014 | Zinniel |
| 2002/0020945 A1 | 2/2002 | Cho et al. |
| 2004/0169699 A1* | 9/2004 | Hunter ................. B29C 64/165 347/54 |
| 2007/0238056 A1 | 10/2007 | Baumann et al. |
| 2008/0111271 A1* | 5/2008 | Khoshnevis .......... B33Y 30/00 264/113 |
| 2012/0231175 A1 | 9/2012 | Tan |
| 2013/0313756 A1 | 11/2013 | Chen et al. |
| 2014/0048981 A1 | 2/2014 | Crump et al. |
| 2014/0271961 A1 | 9/2014 | Khoshnevis |
| 2015/0210016 A1* | 7/2015 | Okamoto ................ B29C 64/40 428/206 |
| 2016/0325506 A1* | 11/2016 | Puigardeu Aramendia ................ B29C 67/0092 |
| 2017/0043535 A1* | 2/2017 | Ng ......................... B33Y 10/00 |

OTHER PUBLICATIONS

Xu, C., et al., "Scaffold-free inkjet printing of three-dimensional zigzag cellular tubes", Biotech. and Bioengin., vol. 109, Issue 12, pp. 3152-3160, Dec. 2012.

* cited by examiner

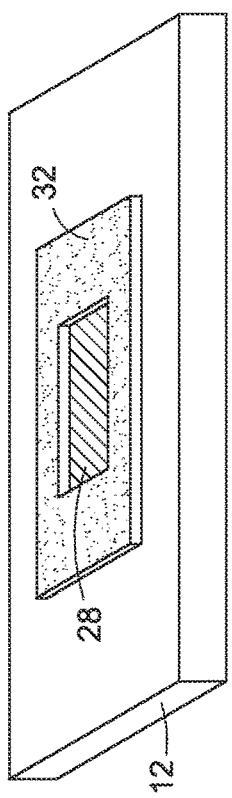
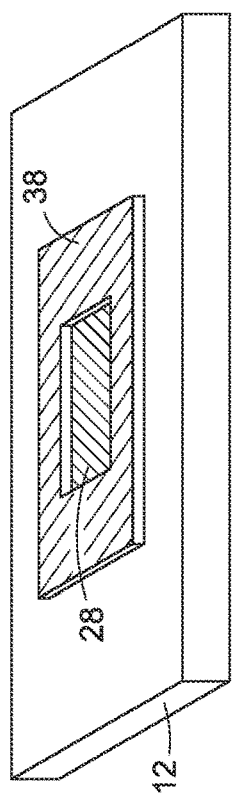
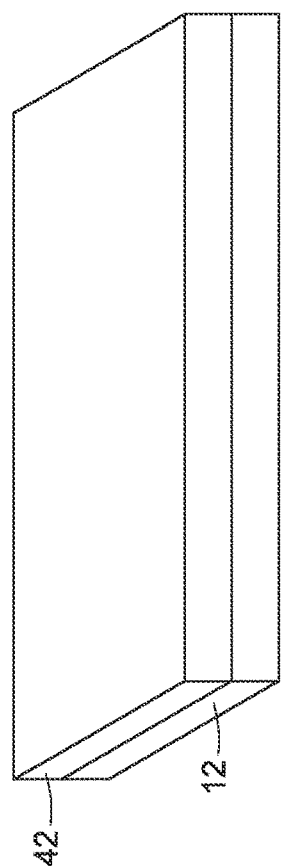
FIG. 4B
FIG. 5B
FIG. 6B
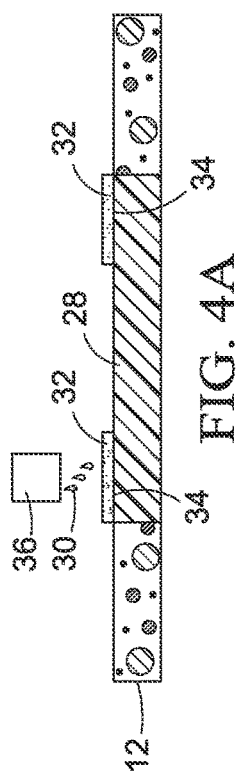
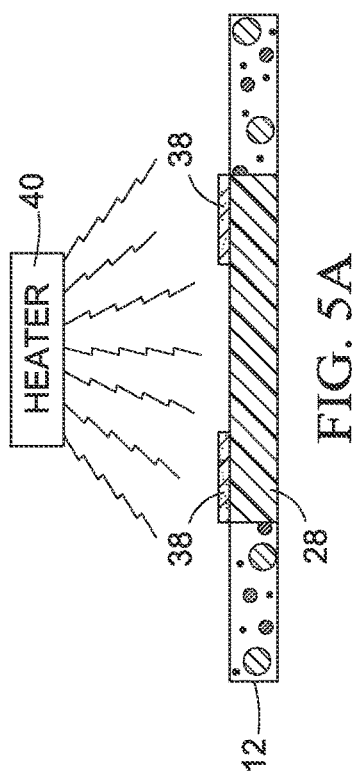
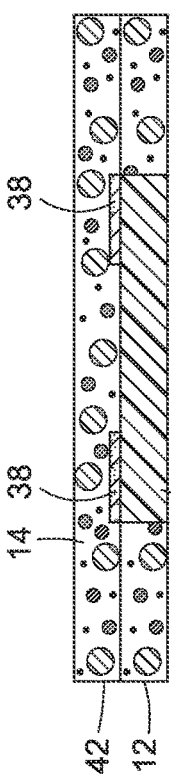
FIG. 4A
FIG. 5A
FIG. 6A

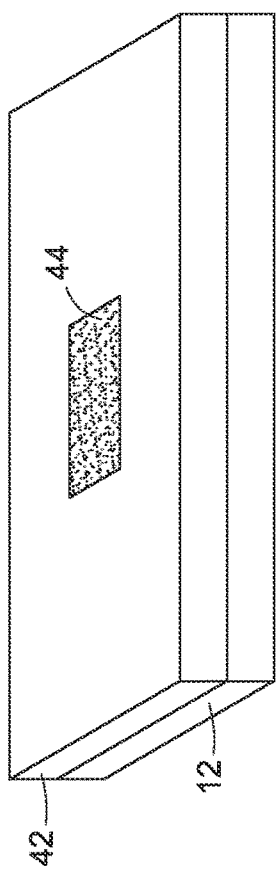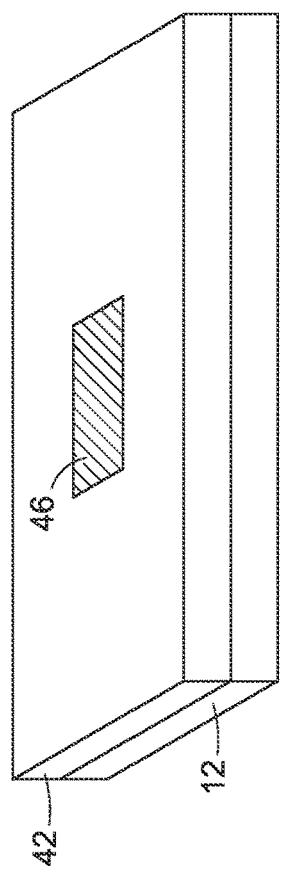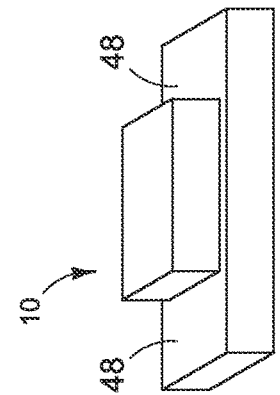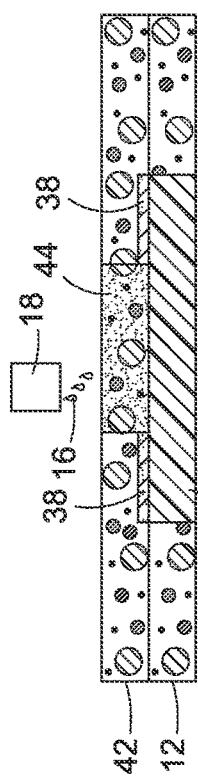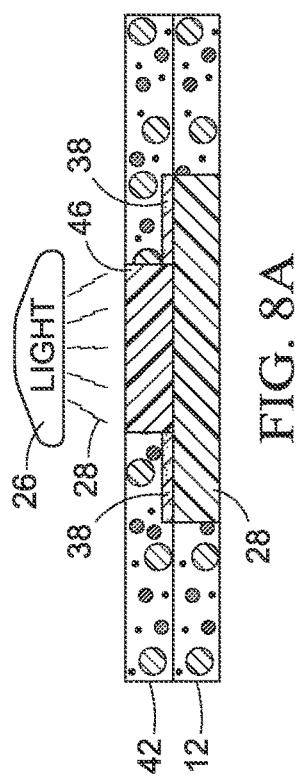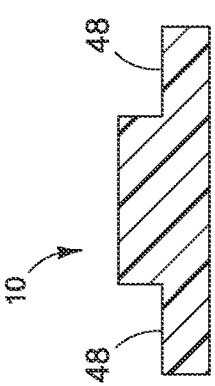

ADDITIVE MANUFACTURING

BACKGROUND

Additive manufacturing machines produce 3D (three-dimensional) objects by building up layers of material. Some additive manufacturing machines are commonly referred to as "3D printers" because they often use inkjet or other printing technology to apply some of the manufacturing materials. 3D printers and other additive manufacturing machines make it possible to convert a CAD (computer aided design) model or other digital representation of an object directly into the physical object.

DRAWINGS

FIGS. 1A-9A and 1B-9B present a sequence of sections and perspectives illustrating one example for additive manufacturing an object with an underhang.

The same part numbers designate the same or similar parts throughout the figures.

DESCRIPTION

Figure 1B:
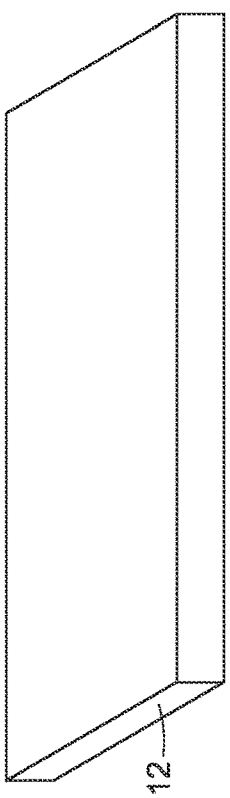

Some additive manufacturing machines make a 3D object by coalescing layers of powdered build material. Additive manufacturing machines make objects based on data in a 3D model created, for example, with a CAD computer program product. The model data is processed into slices, each defining that part of a layer or layers of build material to be coalesced. The examples of additive manufacturing described below use a technique in which a light absorbing ink or other suitable coalescing agent is "printed" on to a layer of build material in the desired pattern and then exposed to light to coalesce the patterned build material. Coalescing agents increase light absorption to generate sufficient heat to sinter, melt or otherwise coalesce the patterned build material for solidification directly (as in sintering) or indirectly through cooling (as in melting).

Coalescing agent may bleed into build material outside the desired pattern, causing the unwanted coalescence and solidification of build material. Also, heat generated in the patterned build material can, under some circumstances, propagate into and solidify surrounding, unpatterned build material. The unwanted solidification of build material can degrade the overall dimensional accuracy and appearance of the manufactured object. Such degradation is often manifested, for example, in poorly defined edges. Modifier agents have been developed to block or neutralize the effects of a coalescing agent. The unwanted solidification of build material may be controlled by dispensing a coalescence modifier agent on to unpatterned build material surrounding build material patterned with a coalescing agent. For example, modifier agents and additive manufacturing processes are described in international patent application no. PCT/US2014/036169 filed Apr. 30, 2014, titled Three Dimensional Printing Method, to prevent or reduce the degree of coalescence of targeted areas of build material to help control dimensional accuracy and surface roughness along the edges in each layer of the manufactured object.

It has been discovered that coalescence modifier agents may also be used to control unwanted fusing between build material and object slices, fusing that can lead to excessive surface roughness in objects with an underhang (that part of an underlying slice that extends past an overlying slice). Accordingly, a new additive manufacturing process has been developed to inhibit or prevent interlayer fusing to obtain smooth, well defined underhangs.

In one example, the new process includes applying a coalescence modifier agent on to a first object slice formed in a first layer of build material as a fusion barrier to protect the top surface of the first slice during formation of a second slice. The modifier agent is applied at locations bordering the area where the second slice will cover the first slice, covering at least part of the underhang. Then, when build material in a second, overlying layer is heated to form the second slice, the fusion barrier prevents, or at least inhibits, heated build material in the second layer from fusing with the first slice in the underhang area so that the top of the underhang on the second slice will remain smooth and well defined. A processor readable medium with instructions for underhang surface control using a coalescence modifier agent may be implemented, for example, in a CAD computer program product, in an object model processor, or in the controller for the additive manufacturing machine.

As used in this document: a "coalescing agent" means a substance that causes or helps cause a build material to coalesce; a "coalescence modifier agent" means a substance that inhibits or prevents coalescence of a build material including, for example, modifying the effect of a coalescing agent; a "slice" means a slice of a multi-slice object; and an "underhang" means that part of an underlying slice that extends past an overlying slice (i.e., an upside down overhang).

Figure 2B:
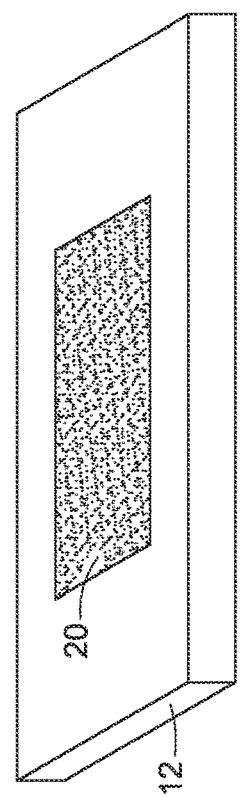
Figure 1A:
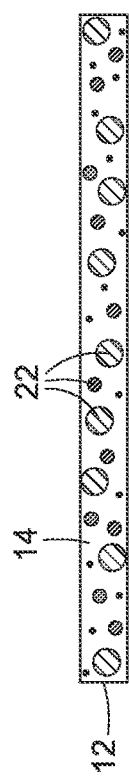
Figure 2A:
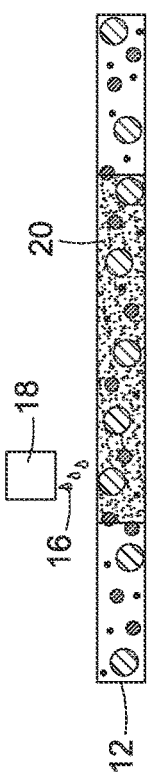
Figure 10:
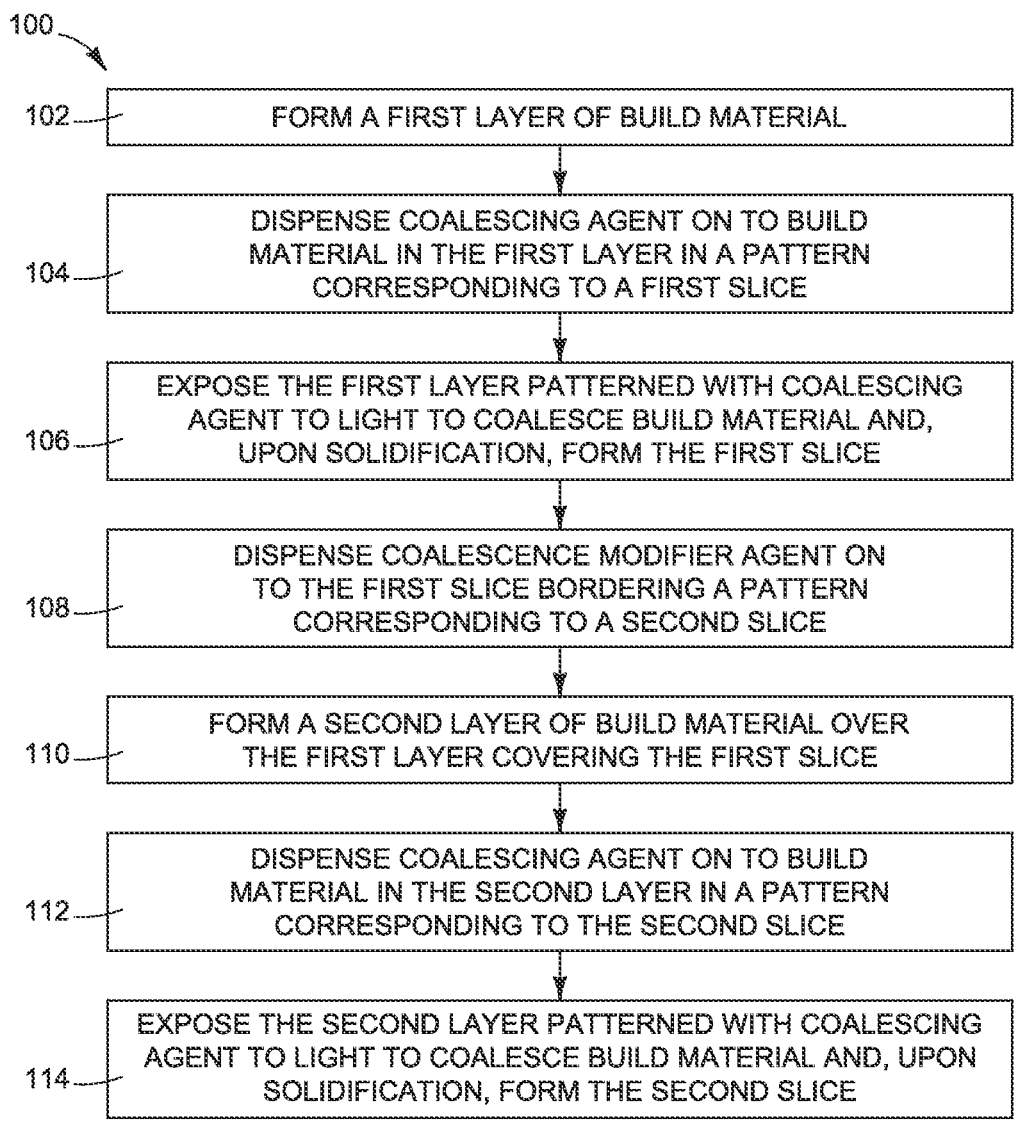
FIGS. 10 and 11 are flow diagrams that illustrate example additive manufacturing processes.

The sequence of sections and perspectives presented in FIGS. 1A-9A and 1B-9B illustrate one example for additive manufacturing an object with an underhang. FIG. 10 is a flow diagram illustrating one example of an additive manufacturing process 100 implemented in FIGS. 1A-9A, 1B-9B. Referring to FIGS. 1A-9A, 1B-9B and FIG. 10, a first layer 12 of build material 14 is formed, as shown in FIGS. 1A, 1B (block 102 in FIG. 10). A coalescing agent 16 is dispensed on to build material 14, as shown in FIGS. 2A, 2B, in a pattern 20 corresponding to an object slice, for example with an inkjet type dispenser 18 (block 104 in FIG. 13). Coalescing agent pattern 20 is depicted by dense stippling in the figures. Any suitable build material 14 may be used to make object 10, shown in FIGS. 9A and 9B, which may be hard or soft, rigid or flexible, elastic or inelastic. Also, while a powdered build material 14 is depicted by particles 22 in this example, suitable non-powdered build materials could also be used.

Figure 3B:
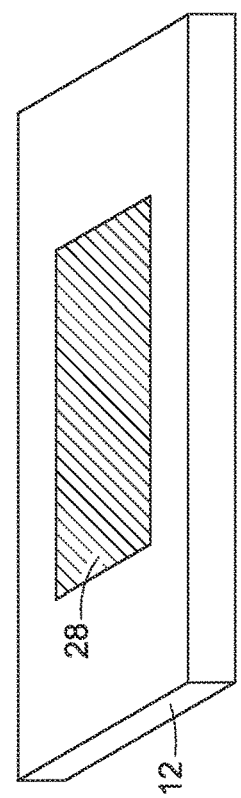
Figure 3A:
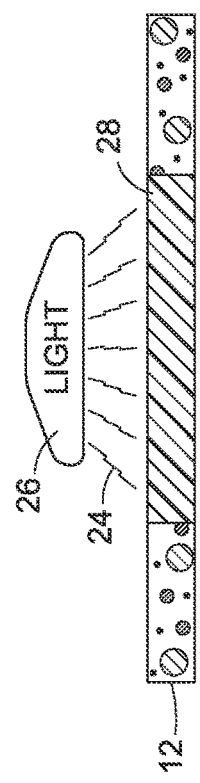

In FIGS. 3A, 3B, the area 20 of layer 12 patterned with coalescing agent is exposed to light 24 from a light source 26 to coalesce build material and, upon solidification, form a first object slice 28 (block 106 in FIG. 10). Depending on the characteristics of build material 14, coalescing agent 16 and light 24, the build material may coalesce, for example, by melting to a liquid or by sintering to a solid. If the build material melts, then solidification occurs upon cooling.

In FIGS. 4A, 4B, a coalescence modifier agent 30 is dispensed on to slice 28 in a pattern 32 covering an area 34 where a second object slice will underhang the first slice (block 108 in FIG. 10), for example with an inkjet type dispenser 36. Modifier agent pattern 32 is depicted by sparse stippling in the figures. In the example shown, the pattern 32 for modifier agent 30 is co-extensive with underhang area 34. Other underhang patterns 32 are possible. For example, if light source 26 is configured to selectively illuminate only those portions of build material patterned with coalescing agent, then it may be desirable to limit pattern 32 to locations immediately bordering the second slice pattern in the underhang areas, (Second slice pattern 44 is shown in FIGS. 7A, 7B.) If, however, light source 26 is configured to illuminate most or all of each layer of build material, then it usually will be desirable for modifier agent pattern 32 to completely cover underhang area 34 as shown in FIGS. 4A and 4B.

Coalescence modifier agent 30 may also be dispensed on to other areas of build material in each layer to help define other aspects of the object slices including, for example, interspersed with the pattern of the coalescing agent to change the material characteristics of the slice. Although two distinct dispensers 18, 36 are shown, agents 16 and 30 could be dispensed from the same dispensers integrated into a single device, for example using different printheads (or groups of printheads) in a single inkjet printhead assembly.

For a liquid modifier agent 30, it may be desirable to dry the patterned area 32 before forming the next layer of build material. In the example shown in FIGS. 5A, 5B, the area of slice 28 patterned with modifier agent is heated to dry the modifier agent and form a solid fusion barrier 38. In other examples, it may be desirable to allow a liquid modifier agent 30 to dry without added heating. Heater 40 in FIG. 5A represents generally any suitable heater, which may include one or more of thermal radiation, convection and conduction.

In FIGS. 6A, 6B, a second layer 42 of build material 14 is formed over first layer 12 covering first slice 28 (block 110 in FIG. 10). In FIGS. 7A, 7B, a coalescing agent 16 is dispensed on to build material 14 in layer 42 in a pattern 44 corresponding to a second object slice underhanging first slice 28 (block 112 in FIG. 10). In FIGS. 8A, 8B, area 44 patterned with coalescing agent is exposed to light 24 to coalesce build material and, upon solidification, form a second object slice 46 (block 114 in FIG. 10). While distinct first and second slices 28, 46 are shown in FIGS. 8A, 8B, the two slices actually fuse together into a single part. The now fused slices 28, 46 are separated from the build material and the fusion barrier, in a process sometimes referred to as "uncaking", as a finished object 10 shown in FIGS. 9A and 9B. Second slice 46 includes part 48 that underhangs first slice 46. While a simple two-slice object 10 is shown, the same process steps may be used to form more complex, multi-slice objects.

Figure 11:
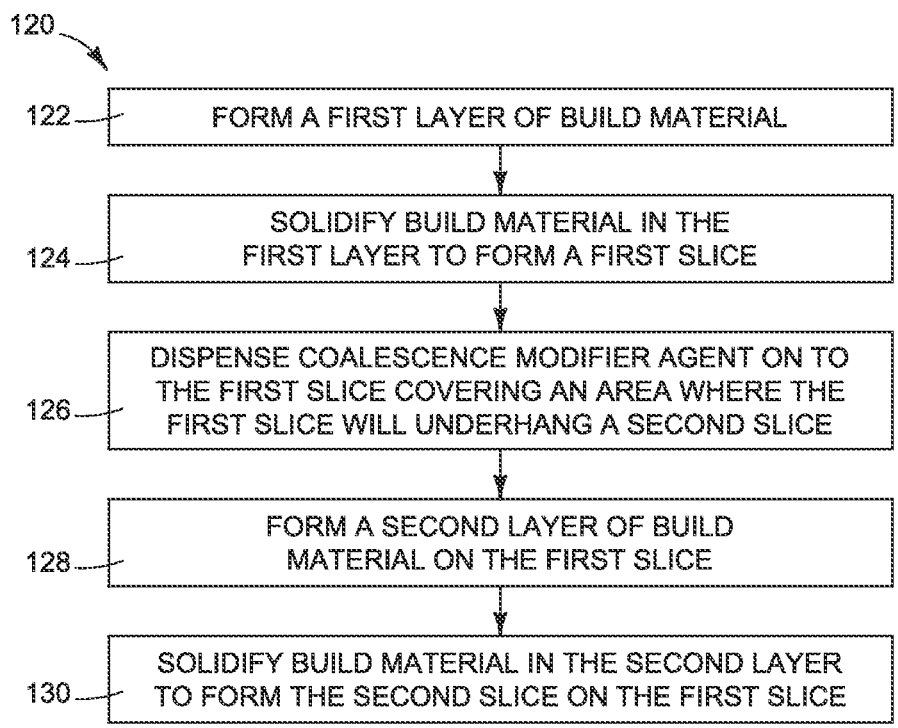

FIG. 11 is a flow diagram illustrating another example of an additive manufacturing process 120. Referring to FIG. 11, a first layer of build material is formed (block 122) and build material in the first layer solidified to form a first slice (block 124), for example as described above with reference to FIGS. 1A-3A, 1B-3B. A coalescence modifier agent is dispensed on to the first slice covering an area where the first slice will underhang the second slice (block 126), for example as described above with reference to FIGS. 4A and 4B. A second layer of build material is formed on the first layer of build material (block 128) and build material in the second layer is solidified to form a second slice on the first slice (block 130), for example as described above with reference to FIGS. 6A-8A, 6B-8B. If a liquid coalescence modifier agent is used, the modifier agent may be dried before forming the second layer of build material, for example by actively heating the modifier agent as shown in FIGS. 5A and 5B. In another example, the heat in a newly formed slice may be sufficient to dry the liquid modifier agent without additional heating.

Figure 12:
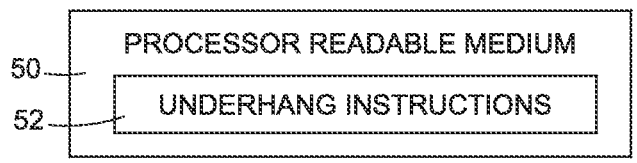
FIG. 12 is a block diagram illustrating one example of a processor readable medium with instructions to help form an underhang during the additive manufacture of an object.

FIG. 12 is a block diagram illustrating a processor readable medium 50 with instructions 52 to help form an underhang during the manufacture of a 3D object. A processor readable medium 50 is any non-transitory tangible medium that can embody, contain, store, or maintain instructions for use by a processor. Processor readable media include, for example, electronic, magnetic, optical, electromagnetic, or semiconductor media. More specific examples of suitable processor readable media include a hard drive, a random access memory (RAM), a read-only memory (ROM), memory cards and sticks and other portable storage devices.

Underhang instructions 52 include instructions to inhibit build material in an overlying layer of build material from fusing with a first slice formed in an underlying layer of build material, for example by dispensing a coalescing modifier agent at block 126 in FIG. 11. Instructions 52 may include other additive manufacturing instructions, for example instructions to form and solidify shown at blocks 122, 124, 128 and 130 in FIG. 11. Processor readable medium 50 with instructions 52 may be implemented, for example, in a CAD computer program product, in an object model processor, or in a controller for an additive manufacturing machine. Control data to inhibit fusing can be generated, for example, by processor readable instructions on the source application, usually a CAD computer program product, in an object model processor, or by processor readable instructions on the additive manufacturing machine.

Figure 13:
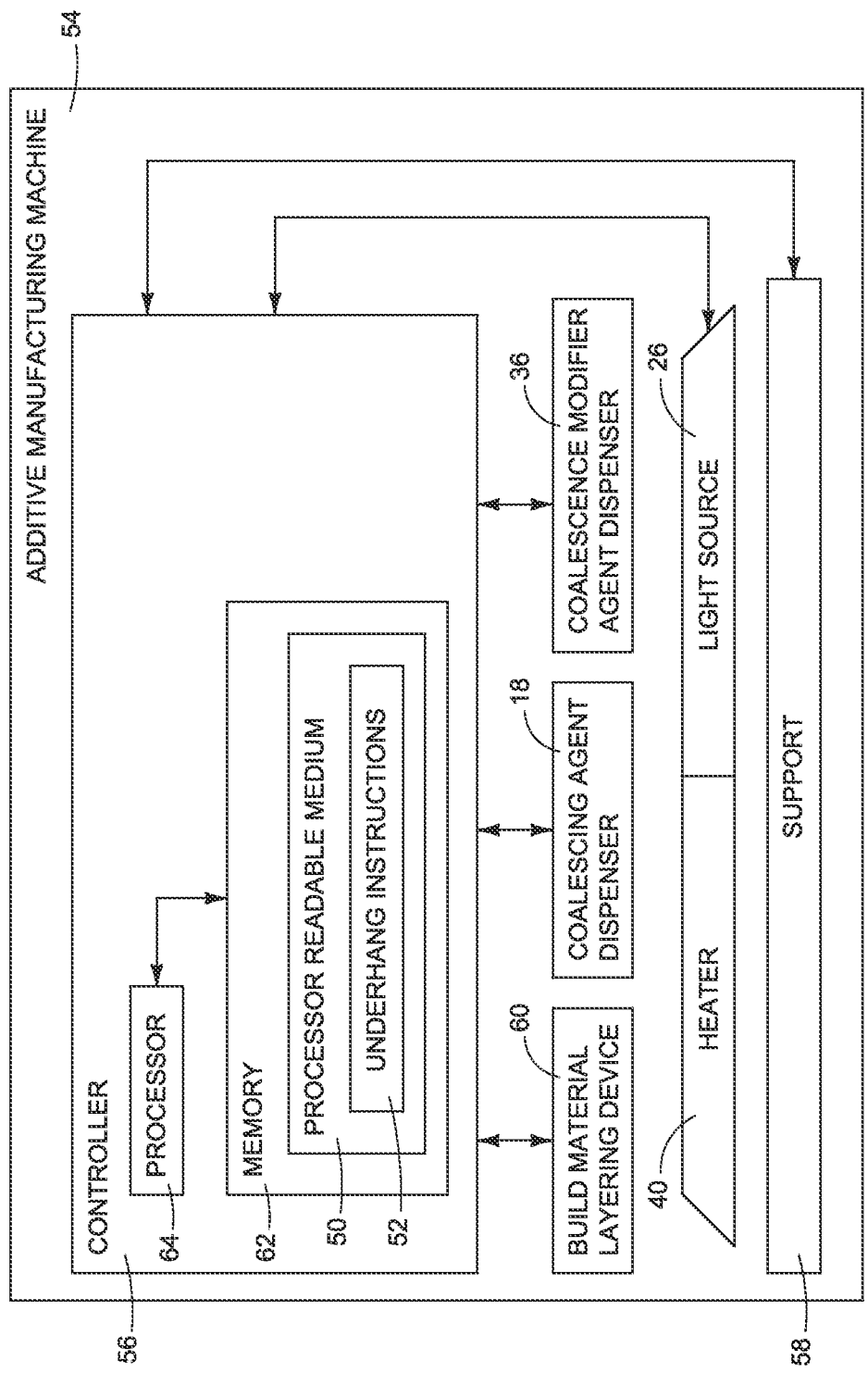
FIG. 13 is a block diagram illustrating one example of an additive manufacturing machine implementing a controller with a processor readable medium with underhang instructions, such as the medium shown in FIG. 12.

FIG. 13 is a block diagram illustrating one example of an additive manufacturing machine 54 implementing a controller 56 with overhang instructions 52. Referring to FIG. 13, machine 54 includes controller 56, a manufacturing bed or other suitable support 58, a roller or other suitable build material layering device 60, a coalescing agent dispenser 18, a coalescence modifier agent dispenser 36, a heater 40 and a light source 26. The in-process object structure is supported on support 58 during manufacturing. In some machines 54, support 58 may be movable at the urging of controller 56 to compensate for the changing thickness of the in-process structure, for example as layers of build material are added during manufacturing.

Build material layering device 60 layers build material on support 58 and on the in-process structures and may include, for example, a device to dispense the build material and a blade or roller to distribute the build material uniformly to the desired thickness for each layer. Coalescing agent dispenser 18 dispenses coalescing agent selectively at the direction of controller 56 on to build material, for example as described above with reference to FIGS. 2A and 7A. Coalescence modifier agent dispenser 36 dispenses modifier agent selectively at the direction of controller 56 on to build material, for example as described above with reference to FIG. 4A. While any suitable dispensers 18, 36 may be used, inkjet printheads are often used in additive manufacturing machines because of the precision with which they can dispense agents and their flexibility to dispense different types and formulations of agents. Manufacturing machine 54 may include a heater 40 if it is desired to pre-heat build material or to heat modifier agent. Light source 26 applies light 24 selectively at the direction of controller 56 to coalesce build material treated with coalescing agent, for example as described above with reference to FIGS. 3A and 8A.

Controller 56 represents the processor (or multiple processors), the associated memory (or multiple memories) and instructions, and the electronic circuitry and components needed to control the operative elements of machine 54. In particular, controller 56 includes a memory 62 having a processor readable medium 50 with underhang instructions 52, and a processor 64 to read and execute instructions 52. For example, controller 56 would receive control data and other instructions from a CAD program to make an object that includes an overhang and execute local underhang instructions 52 as part of the process of making the object.

Figure 14:
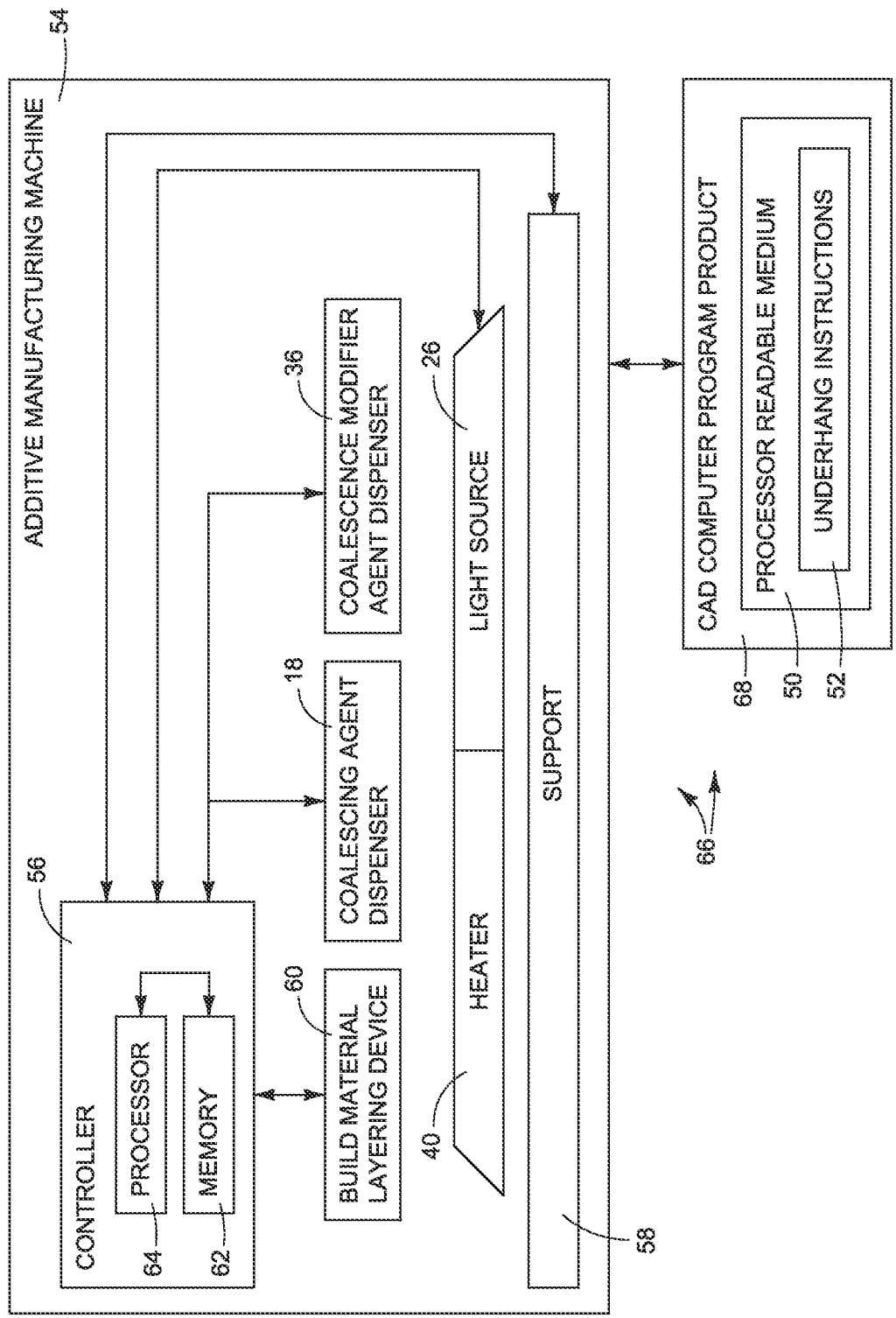
FIG. 14 is a block diagram illustrating one example of an additive manufacturing system implementing a CAD computer program product with a processor readable medium with underhang instructions, such as the medium shown in FIG. 12.

Alternatively, underhang instructions 52 may be embodied in a processor readable medium 50 separate from controller 56, for example as part of a CAD computer program product shown in FIG. 14. Referring to FIG. 14, an additive manufacturing system 66 includes an additive manufacturing machine 54 operatively connected to a CAD computer program product 68 with underhang instructions 52 residing on a processor readable medium 50. Any suitable connection between machine 54 and CAD program product 68 may be used to communicate instructions and control data to machine 54 including, for example, a wired link, a wireless link, and a portable connection such as a flash drive or compact disk.

Light source 26 applies light energy to build material to cause the coalescence of portions of the build material according to where coalescing agent has been delivered or has penetrated. In some examples, light source 26 is an infra-red (IR) or near infra-red light source, or a halogen light source. Light source 26 may be a single light source or an array of multiple light sources. In some examples, light source 26 is configured to apply light energy in a substantially uniform manner simultaneously to the whole surface of a layer of build material. In other examples, light source 26 is configured to apply energy to only select areas of the whole surface of a layer of build material.

Build material may be a powder, a liquid, a paste, or a gel. Examples of build material include semi-crystalline thermoplastic materials with a processing window of greater than 5° C. (i.e., the temperature range between the melting point and the re-crystallization temperature). Suitable build materials may include polyamides (e.g., PA or nylon 11, PA or nylon 12, PA or nylon 6, PA or nylon 8, PA or nylon 9, PA or nylon 66, PA or nylon 612, PA or nylon 812, PA or nylon 912), polyethylene, polyethylene terephthalate (PET), polystyrene, polyacetals, polypropylene, polycarbonate, polyester, thermal polyurethanes, other engineering plastics, and blends of any two or more of the polymers listed. Core shell polymer particles of these materials may also be used.

Build material may have a melting point ranging from about 50° C. to about 400° C. In some implementations, it is desirable that the melting point of the build material be less than (lower than) the melting point of an inorganic salt used in the modifier agent. As examples, polyamide 12 having a melting point of 180° may be used, or thermal polyurethanes having a melting point ranging from about 100° C. to about 165° C. may be used. In one example, when a combination of polymer particles is used in the build material, at least one of the particles has a melting point below the melting point of the inorganic salt in the modifier agent.

The build material may be made up of similarly sized particles or differently sized particles. In the example shown in the figures, the build material includes particles of three different sizes. As one example of the different sizes for each of the build material particles, the average of each size particle may be greater than 50 μm, between 10 μm and 30 μm, and less than 10 μm. In an example, the largest particles are present in an amount ranging from 70 wt % to 95 wt %, the medium particles present in an amount ranging from 0.5 wt % to 21 wt %, and the smallest particles present in an amount ranging from greater than 0 wt % up to 21 wt %.

Build material may include, in addition to polymer particles, a charging agent and a flow aid. A charging agent may be added to suppress tribe-charging. Suitable charging agents may include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the polymer particles. A flow aid improves the flowability of build material by reducing friction, lateral drag, and tribe-charging, and may be particularly desirable when build material particles are less than 25 μm in size. Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the particles.

Suitable coalescing agents include water-based dispersions with an active, radiation absorbing binding agent. The active agent may be, for example, an infrared light absorber, a near infrared light absorber, or a visible light absorber. As one example, the coalescing agent may be an ink-type formulation including carbon black as the active material. An example of this ink-type formulation is commercially known as CM997A available from Hewlett-Packard Company. Examples of inks including visible light enhancers as the active agent are dye based colored ink and pigment based colored ink. Examples of pigment based inks include the commercially available inks CM993A and CE042A, available from Hewlett-Packard Company. The aqueous nature of some coalescing agent enables the coalescing agent to penetrate the layer of build material. For hydrophobic build materials the presence of a co-solvent and/or a surfactant in the coalescing agent may assist in obtaining the desired wetting. One or more coalescing agents may be dispensed to form each slice.

Suitable coalescence modifier agents may separate individual particles of the build material to prevent the particles from coalescing. Examples of this type of modifier agent include colloidal, dye-based, and polymer-based inks, as well as solid particles that have an average size less than the average size of particles of the build material. The molecular mass of the modifier agent and its surface tension may be such that it enables the agent to penetrate sufficiently into the build material to achieve the desired mechanical separation. In one example, a salt solution may be used as a coalescence modifier agent. In other examples, inks commercially known as CM996A and CN673A available from Hewlett-Packard Company may be used as a coalescence modifier agent.

Suitable coalescence modifier agents may act to modify the effects of a coalescing agent by preventing build material from reaching the melting point. A fluid that exhibits a suitable cooling effect may be used as this type of coalescence modifier agent. For example, when build material is treated with a cooling fluid, energy applied to the build material may be absorbed evaporating the fluid to help prevent build material from reaching its melting point. Thus, for example, a fluid with a high water content may be a suitable coalescence modifier agent.

"A" and "an" used in the claims means one or more.

The examples shown in the figures and described above illustrate but do not limit the scope of the patent, which is defined in the following Claims.

What is claimed is:

1. An additive manufacturing process, comprising:
   forming a first layer of build material;
   dispensing a liquid, light absorbing coalescing agent on to build material in the first layer in a pattern of a first slice of an object;
   exposing build material in the first layer patterned with coalescing agent to light to generate heat to melt patterned build material in the first layer to form the first slice;
   dispensing a liquid coalescence modifier agent on to the first slice covering an area where the first slice will underhang a second slice of the object;
   forming a second layer of build material on the first slice;
   dispensing a liquid, light absorbing coalescing agent on to build material in the second layer in a pattern of the second slice; and
   exposing build material in the second layer patterned with coalescing agent to light to generate heat to melt patterned build material in the second layer to form the second slice on the first slice.

2. The process of claim 1, comprising drying the modifier agent on the first slice before forming the second layer of build material.

3. The process of claim 2, where drying the modifier agent includes heating the modifier agent.

4. An additive manufacturing machine, comprising:
   a first device to layer powdered build material;
   a second device to dispense a liquid, light absorbing coalescing agent on to build material;
   a third device to dispense a liquid coalescence modifier agent on to build material;
   a light source to apply light energy to build material; and
   a controller to execute instructions to:
   cause the first device to layer build material in a first layer;
   cause the second device to dispense a liquid, light absorbing coalescing agent on to build material in the first layer in a first pattern of a first slice of an object;
   cause the light source to apply light energy to build material in the first layer patterned with coalescing agent to generate heat to melt patterned build material in the first layer, to form the first slice;
   cause the third device to dispense a liquid coalescence modifier agent on to the first slice bordering an area where a second slice of the object will cover the first slice;
   cause the first device to layer build material in a second layer over the first slice;
   cause the second device to dispense a liquid, light absorbing coalescing agent on to build material in the second layer in a second pattern of the second slice; and
   cause the light source to apply light energy to build material in the second layer patterned with coalescing agent to generate heat to melt patterned build material in the second layer, to form the second slice on the first slice.

5. The machine of claim 4, where the controller is to execute instructions to dry the modifier agent on the first slice before forming the second layer of build material.

6. The machine of claim 5, where the instructions to dry the modifier agent include instructions to heat the modifier agent.

7. The machine of claim 4, where the instructions to cause the third device to dispense a coalescence modifier agent on to the first slice reside on the controller.

* * * * *